US005319817A

United States Patent [19]

Hay et al.

[11] Patent Number: 5,319,817
[45] Date of Patent: Jun. 14, 1994

[54] FOLDING PATIENT LIFT AND WEIGHING APPARATUS

[75] Inventors: Mohammed R. Hay, Yuba City; Gary A. Schaal, Loma Rica, both of Calif.

[73] Assignee: Andermac, Inc., Yuba City, Calif.

[21] Appl. No.: 944,775

[22] Filed: Sep. 15, 1992

[51] Int. Cl.5 .......................... A61G 7/012; A61G 7/05
[52] U.S. Cl. ............................................ 5/611; 5/600;
5/620; 5/86.1; 16/327; 16/332; 177/144
[58] Field of Search .................. 5/81.1, 86.1, 620, 611,
5/600; 16/332, 327; 177/144

[56] References Cited

U.S. PATENT DOCUMENTS

| | | | |
|---|---|---|---|
| 1,347,549 | 7/1920 | Mote | 5/620 |
| 3,099,020 | 7/1963 | Garfield et al. | 5/620 |
| 3,564,625 | 2/1971 | Danielson | 5/81.1 |
| 4,939,801 | 7/1990 | Schaal et al. | 5/607 |

Primary Examiner—Alexander Grosz
Attorney, Agent, or Firm—Townsend and Townsend Khourie and Crew

[57] ABSTRACT

A patient lift apparatus is provided with a U-shaped base that folds to enable convenient reduced width storage of the unit when not in use. Accordingly, the U-shaped base of the unit has a hinge with a vertical axis in each leg of the "U". These hinges are located midway of each of the vertical legs. Typically, these hinges provide for a pivotal movement of the casters at the ends of each leg of the "U" from a caster extended position for patient lifting and transport to a caster folded position parallel to and spaced apart from the base of the "U". A releasable lock mechanism is provided to each leg for locking the hinge in either the caster extended position or the caster folded position. The lock includes an outer moving sleeve with a spring biased inner key connected to the spring biased sleeve. The key moves with the sleeve and fits into and out of paired apertures in the hinge. One aperture of the hinge is for maintaining the hinge in the caster folded position; the other aperture of the hinge is for maintaining the hinge in the caster extended position. In operation, an attendant moves the sleeve to unlock the hinge. Thereafter, and while the rest of the lift apparatus is supported at its respective casters, the outer leg member of the "U" is moved between the caster folded position and the caster extended position for patient transport.

10 Claims, 6 Drawing Sheets

FOLDING PATIENT LIFT AND WEIGHING APPARATUS

This invention relates to lift apparatus utilized in hospitals for the movement of patients. More particularly, a lift apparatus is shown which conveniently folds for storage when not in use. The disclosed lift is made for weighing patients while permitting patients to be raised and lowered with the unit.

BACKGROUND OF THE INVENTION

A patient lift apparatus is known which includes a U-shaped base. The U-shaped base of the unit has four casters provided; two casters are provided on the inside of the "U" and two casters are provided at the end of each distal leg of the "U". The base supports an overlying stretcher frame member in cantilevered fashion from the base of the "U" to one side of the frame. Typically, between the base and the cantilevered frame, there is provided apparatus for raising and lowering the frame with respect to the base.

Use of the device is easy to understand. Specifically, a patient on a hospital bed is placed on a stretcher sheet—the strong layer of fabric capable of supporting the patient in tensile suspension from the frame. Thereafter, the base is moved under the bed from one side while the rectilinear frame is lowered about the patient. When the rectilinear frame is lowered about the patient, the stretcher material is fastened to the frame. Thereafter, when the frame is lifted, the patient is lifted with the frame.

In Schaal et al. U.S. Pat. No. 4,939,801 entitled PATIENT TRANSPORTING AND TURNING GURNEY issued Jul. 10, 1990, an apparatus for lifting, inverting, and lowering a patient from a hospital bed to an operating table is shown. The apparatus includes a "U-shaped" base with an overlying rectilinear frame. The stretcher frame of the Schaal et al. device is capable of being pivoted. Like the patient lift apparatus described above, a lift mechanism is provided from the base to the support of the stretcher frame.

In the Schaal et al. device, turning of the patient can occur—from either front to back or back to front. In either case, a second canvas sheet is utilized. This sheet is fastened from the same frame over the top of the patient. When the sheet is securely attached, the frame is inverted. When this occurs, the now upper sheet is removed and the patient lowered either onto a hospital bed or alternatively to an operating table.

Unfortunately, either the above described patient lifting device or the Schaal patient inverting lift is typically stored in hospital corridors when not in use. Since both the base and the frames utilized overlying the base are large, especially in width, such storage is other than convenient. Further, many hospitals are characterized by having other than the wide conventional corridors. This being the case, there is a need for the fabrication of a patient lift apparatus which can be conveniently stored.

Devices for the weighing of patients have been complicated. Further, they have not heretofore been combined with apparatus capable of raising, transporting, and placing the patient between locations in a hospital. Instead, separate handling of patient is required for weighing.

SUMMARY OF THE INVENTION

A patient lift apparatus is provided with a U-shaped base that folds to enable convenient reduced width storage of the unit when not in use. Accordingly, the U-shaped base of the unit has a hinge with a vertical axis in each leg of the "U". These hinges are located midway of each of the distal legs of the "U". Typically, these hinges provide for a pivotal movement of the casters at the ends of each leg of the "U" from a caster extended position for patient lifting and transport to a caster folded position parallel to and spaced apart from the base of the "U". A releasable lock mechanism is provided to each leg for locking the hinge in either the caster extended position or the caster folded position. The lock includes an outer moving sleeve with a spring biased inner key connected to the spring biased sleeve. The key moves with the sleeve and fits into and out of paired apertures in the hinge. One aperture of the hinge is for maintaining the hinge in the caster folded position; the other aperture of the hinge is for maintaining the hinge in the caster extended position. In operation, an attendant moves the sleeve to unlock the hinge. Thereafter, and while the rest of the lift apparatus is supported at its respective casters, the outer leg member of the "U" is moved between the caster folded position and the caster extended position for patient transport. There results the capability to collapse and store the patient transport unit at essentially one half of that width required for operational patient transport.

Provision is made for folding the upper patient transport frame—either with or without an attached stretcher sheet. Specifically, and in the middle of both minor members of the rectilinear frame, there is provided a hinge for folding the top of the unit to a profile matching the bottom of the unit. Each hinge consists of two pivot members connected by a short hinge link. Each of the two pivot members of each hinge folds 90°; when folded, each half of the stretcher is maintained spaced apart from the other stretcher half. This folding enables convenient storage of the unit as well as raising of the outwardly extended half of the upper stretcher support unit to fit over a patient for fastening of the stretcher sheet to the frame.

Provision is made for weighing of the supported patient. Specifically, two transducers in parallel sum their respective outputs to provide the weight of the patient once lifting has occurred. The transducers are in turn supported at the side of the stretcher below a lift mechanism. The lift mechanism is hinged and acts to move low friction telescoping supports for the rasing and lowering of the stretcher, this lifting being independent of the measured weight of the patient. Consequently, there exists a weighing device that can take an accurate weight measurement of patients during required patient moving and transport.

BRIEF DESCRIPTION OF THE DRAWINGS

Other objects, features and advantages of this invention will become more apparent after referring to the following specification and attached drawings in which:

FIG. 7B illustrates the construction of one of the two telescoping guides utilized for guiding of the raising and lowering of the patient.

DESCRIPTION OF THE PREFERRED EMBODIMENT

Figure 1:
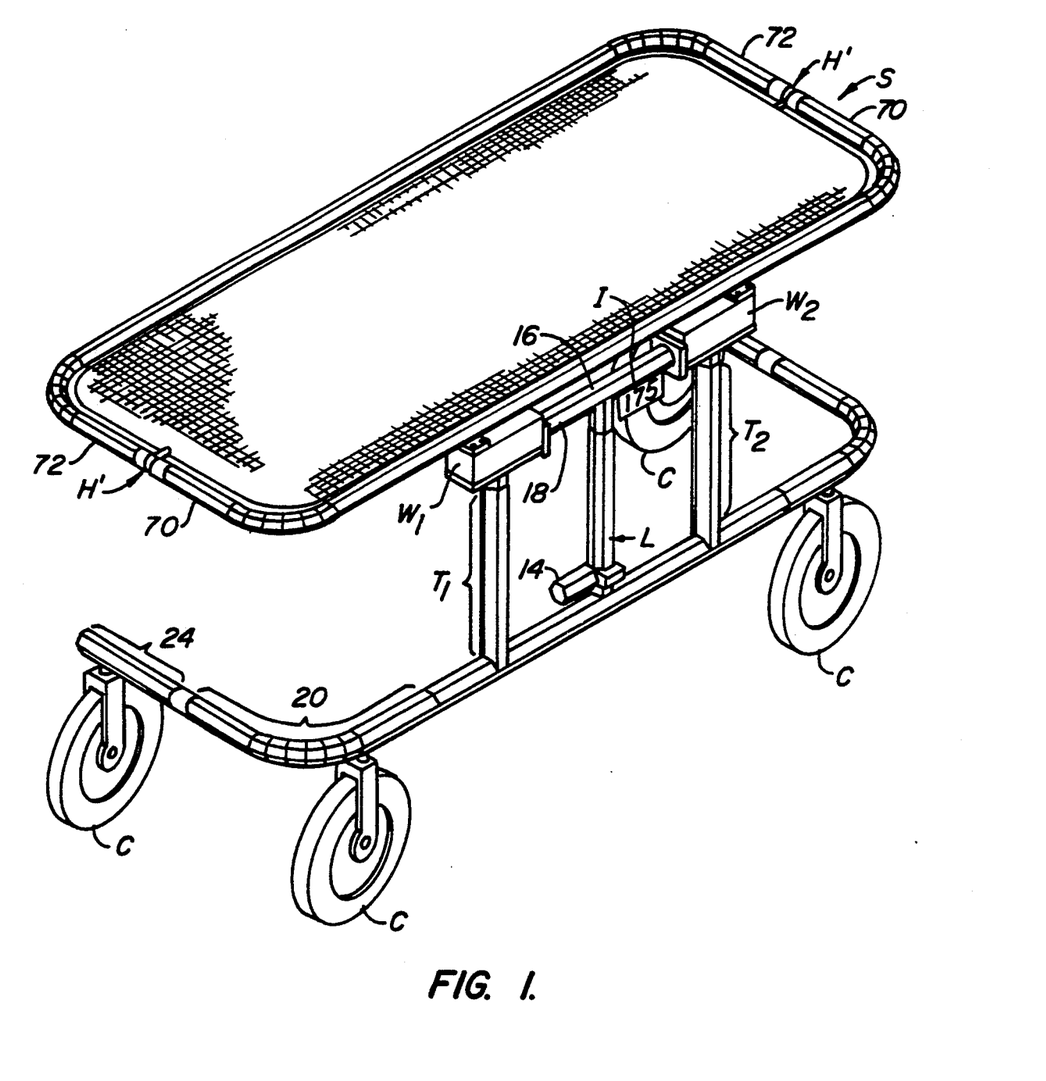
FIG. 1 is a perspective view of the patient transport system disposed for patient transport.

Referring to FIG. 1, the stretcher S is illustrated. It includes a lift mechanism L operated by motor 14. Mechanism L elevates central member 16 having cross bar 18 having weight transducers $W_1$, $W_2$. Below each of weight transducers $W_1$, $W_2$, there resides respective telescoping members T1, T2, which insure that raising and lowering of stretcher S occurs parallel to the floor on which the stretcher S is supported.

Figure 2:
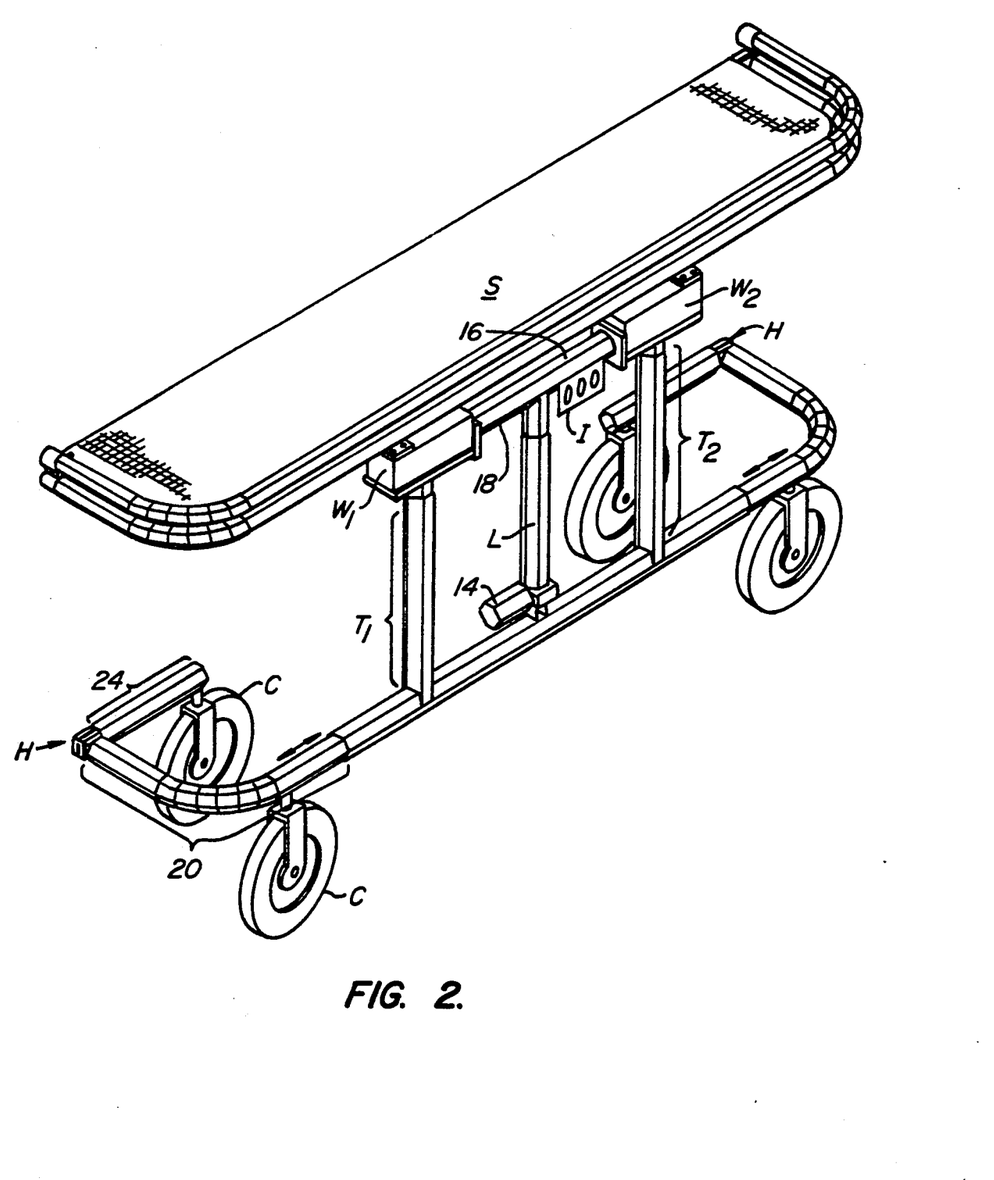
FIG. 2 is a perspective view of the patient transport system FIG. 1 with the casters in the caster folded position parallel to the base of the "U" shaped lower frame with the upper part of a stretcher folded over to collapse the entire unit to one half operational width.
Figure 3:
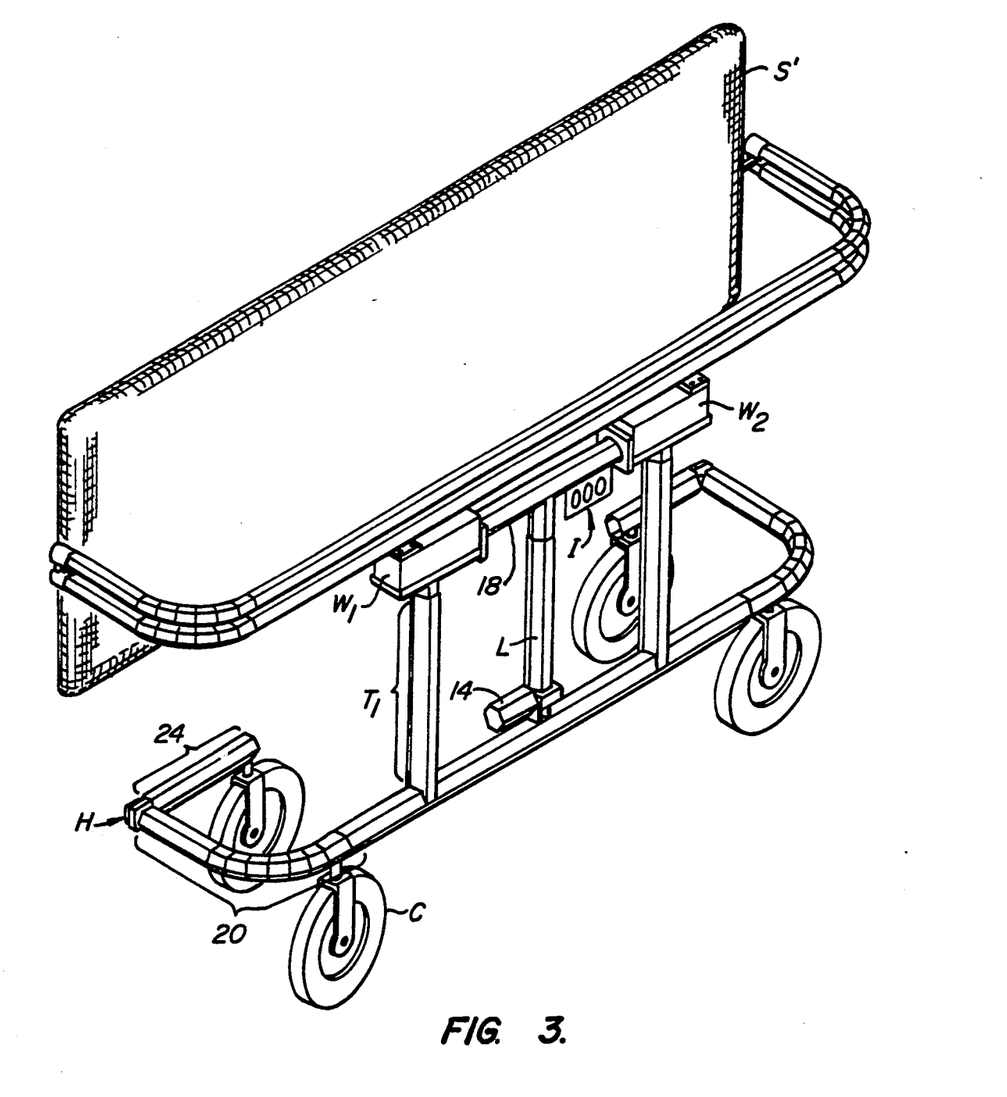
FIG. 3 is a reduced perspective view similar to FIG. 2 illustrating the base of this invention applied to the Schaal et al apparatus of U.S. Pat. No. 4,939,801 illustrating the tipping of the stretcher mechanism of Schaal to a vertical disposition for storage.

Referring to FIG. 1, it will be observed that there is a "U" shaped bottom support frame including an outer hinged member 24 and an inner rigid "U" shaped member 20. It is the ability of these members to move on hinges relative to one another that enables the invention to collapse to minimal dimension. This disposition is illustrated in FIG. 2. Support includes four casters C.

Referring to FIG. 2, collapse of the unit for preferred storage is illustrated. Specifically, leg 24 has been folded at hinges H to swing casters C inwardly to and toward the base of the "U". Construction of this hinge H is illustrated with respect to FIGS. 4A and 4B.

Figures 4A, 4B, 5:
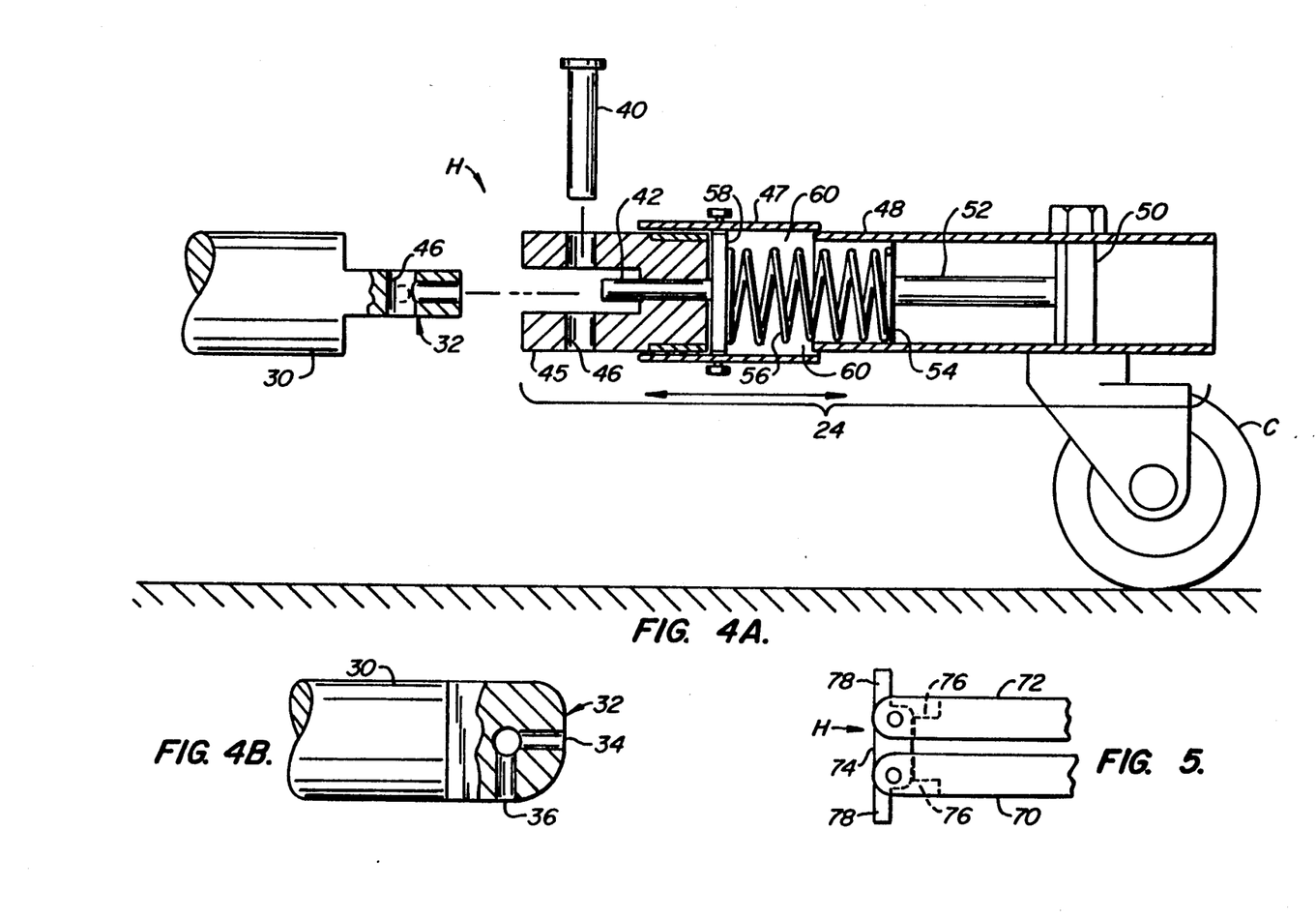
FIG. 4A is an exploded side elevation section of one of the hinge of this invention illustrating the spring biased sleeve and locking pin for allowing both movement and locking of the hinge in the respective caster stored or caster extended positions.
FIG. 4B is a plan section taken at the locking holes of the hinge illustrating the respective locking pin holes for maintaining the hinge in the caster stored position or the caster extended position for patient transport.
FIG. 5 is a side elevation of the hinge for folding the frame.

Referring to FIG. 4A, an exploded view of hinge H is included. Hinged member 24 includes a male hinge member 30 having a protruding female leaf 32. Leaf 32 includes two bores, bore 34 for locking the hinge with the end of the "U" extended and bore 36 for locking the hinge with the end of the "U" folded (See FIG. 4B).

The construction of hinged arm 24 is more complicated. This includes female hinge member 45 with pin bore 46 to receive pin 40. A pin 42 reciprocates inward and outward for alternative penetration of respective bores 34, 36. Reciprocation is actuated by sleeve 47. Sleeve 47 has pin 58 across the sleeve with pin 58 confined with slot 60 in member 24. From pin 58 there protrudes pin 42 which effectively locks and unlocks hinge H.

Caster C rotates on shaft 50. Shaft 50 has spring rod 52 bearing against shaft 50 and supporting disc 54. A coil spring 56 bears against pin 58 biasing pin 42 into engagement with leaf 32 at either bore 34, 36.

Operation is simple. By retraction of sleeve 47, pin 42 moves against the bias of spring 56. Once withdrawal from one bore 34, 36 occurs, release of sleeve 47 will cause penetration of the remaining bore 36, 34 when hinged member 24 is in proper relationship with respect to member 20 (See FIGS. 1 and 2).

Referring back to the construction illustrated in FIGS. 1 and 2, it is also seen that it is convenient to fold stretcher S when member 24 folds with respect to member 20. Such a folding mechanism is illustrated (in an expanded detail) as shown in FIG. 5.

Referring to FIG. 1 and 2, two hinge members H' are illustrated. The construction of one such hinge member H' is shown in FIG. 5.

Each of the respective stretcher sides 70, 72 defines a female leaf hinge member capturing a link 74. Link 74 includes at the end thereof, rod portions 78. When the respective members 70, 72 are parallel to one another, rod portions 78 engage the limits of pockets 76 in each hinge member. At the same time, link 74 allows folding of the unit with members 70, 72 spaced apart from one another and not in interference with one another.

Figure 6:
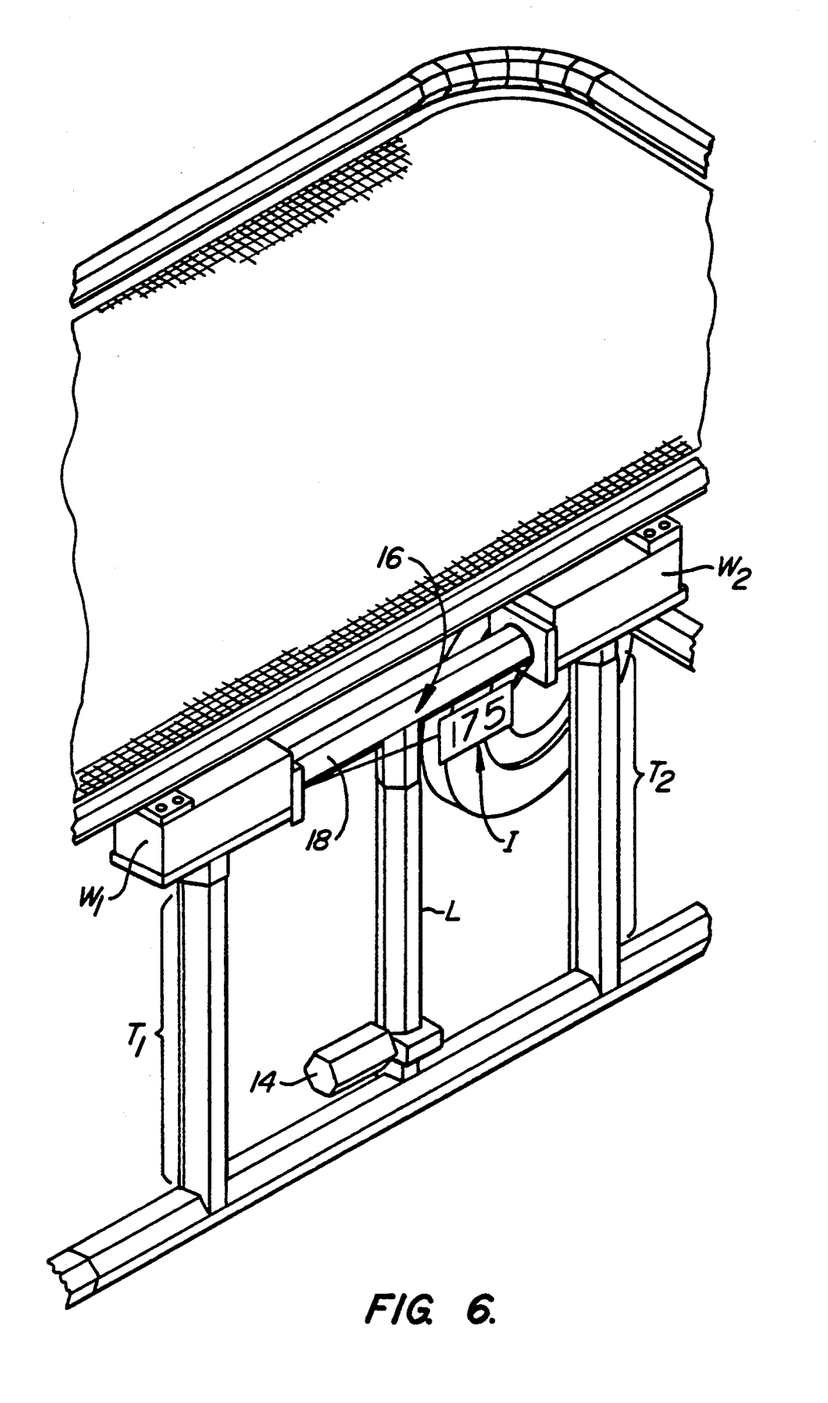
FIG. 6 is a perspective of the stretcher taken at the lifting mechanism illustrating the de-coupling of the patient lift mechanism from the apparatus which can measure the patient's weight during required patient moving; and, FIGS. 7A and 7B are respective details of FIG. 6 with FIG. 7A illustrating the pivot of the lift apparatus to avoid input of the forces of lifting to the desired weighing of the patient

Referring to FIG. 6, the lift mechanism L and its operation with telescoping members $T_1$ and $T_2$ can be understood. First, central member 16 raises and lowers under guidance of telescoping members $T_1$ and $T_2$. One such member T is illustrated in FIG. 7B.

Figure 7A:
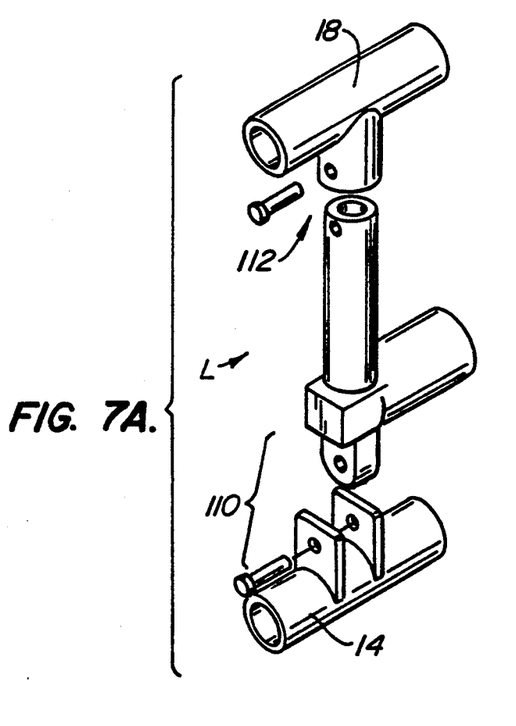
Figure 7B:
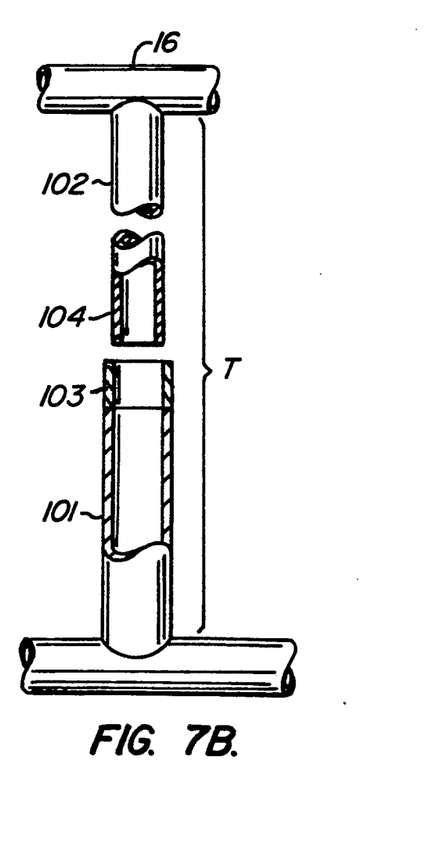

Referring to FIG. 7B, lower female telescoping member 101 has a low friction plastic annulus 103. Annulus 103 is designed to provide a low friction fit with respect to the exterior of male telescoping member 102.

Similarly, upper telescoping member 102 has a low friction plastic annulus 104. Annulus 104 is designed to provide a low friction fit with respect to the interior of female telescoping member 101. It will be realized that by using two such telescoping members $T_1$ and $T_2$, low friction up and down motion of cross bar 16 under guidance of lift mechanism L can occur.

Referring to FIG. 7A, it will be understood that lift mechanism L acts between clevis 110 (shown in an exploded format) and pivot 112. Thus, when lift mechanism L is actuated, no part of the load passes through either of the transducers $W_1$ and $W_2$.

There thus results a lifting mechanism which is completely independent of weighing stretcher S.

Returning to FIG. 6, a commercially available indicator I sums transducers $W_1$ and $W_2$ to read out patient weight without input of torque. Because transducers $W_1$ and $W_2$ are independent of lifting mechanism L, no input from the lift will be input to the weight of the patient.

What is claimed is:

1. In a patient stretcher lift apparatus of the type including:
    an overlying rectilinear frame for forming a portion of said stretcher;
    an underlying "U" shaped frame having a cross member for forming the base of said "U" and two underlying stretcher supporting members forming the sides of said "U";
    four casters for support of said underlying "U" shaped frame with two of said casters being supported on opposite ends of the cross member of said "U" and two said casters being supported at the distal ends of the stretcher supporting members of said "U"; and, a lift apparatus extending between said underlying "U" shaped frame and said overlying rectilinear frame for raising and lowering said overlying rectilinear frame with respect to said "U" shaped base;

the improvement to said stretcher apparatus comprising:

means for supporting said overlying rectilinear frame in a first position having reduced width for stowage of said stretcher and in a second horizontal position for supporting a patient on said stretcher;

first and second hinges having vertical hinge axes, said first hinge being located midway of one of said stretcher supporting members of said "U" and said second hinge being located midway of the other of said stretcher supporting members of said "U", each said hinge for permitting movement of the one half of said stretcher supporting members remote from the cross member of said "U" between a caster folded position extending the outer extremity of said stretcher supporting member parallel to said base of said "U" underlying the reduced width of said stretcher in said first position having reduced width for the stowage of said stretcher to a second extended position disposing said vertical member of said "U" for support of said stretcher in said second horizontal position for supporting a patient on said stretcher; and, means for locking each of said hinge members in either said caste folded position or said caster extended position whereby said stretcher is supported for stowage with reduced dimension between said casters in said caster folded position and is capable of supporting a patient with expanded dimension between said casters in said caster extended position.

2. The patient lift apparatus of claim 1 and wherein said means for locking each said hinge includes:

a spring biased sleeve attached to each said distal leg of said "U" shaped base, said spring biased sleeve biased for movement towards said hinge;

a key attached to said hinge and biased from movement towards and away from said hinge;

first and second keyways in said hinge for engaging said key, said first keyway when engaged to said key for maintaining said hinge in said caster folded position and said second keyway when engaged to said key for maintaining said hinge in said caster extended position.

3. The patient lift apparatus of claim 1 and wherein said overlying rectilinear frame is rotatable with respect to said "U" shaped base between a first horizontal position for carrying a patient and a second vertical position for storage of said unit.

4. The patient lift apparatus of claim 1 and wherein said overlying rectilinear frame includes hinges midway of said minor member of said rectilinear frame for permitting one half of said frame to fold over another half of said frame.

5. The patient lift apparatus of claim 4 and wherein said patient lift apparatus further includes:

means for weighting said stretcher between said stretcher frame and said means for supporting said stretcher frame including strain gauge means;

means for permitting said means for supporting said stretcher means to be raised and lowered towards and away from each other extending between said means for supporting said stretcher frame and said underlying U-shaped frame to enable said stretcher to be maintained parallel to said U-shaped frame during said raising and lowering; and, said lifting apparatus extending between said frames, independent of said means of raising and lowering, said lifting apparatus having hinged connection at said U-shaped frame and at said means for supporting said stretcher frame whereby the force of raising and lowering said rectilinear frame is independent of said weighting mechanism.

6. In a patient stretcher lift apparatus comprising:

an overlying rectilinear frame for forming a portion of said stretcher;

an underlying "U" shaped frame having a cross member for forming the base of said "U" and two underlying stretcher supporting members forming the sides of said "U";

four casters for support of said underlying "U" shaped frame with two of said casters being supported on opposite ends of the cross member of said "U" and two said casters being supported at the distal ends of the stretcher supporting members of said "U"; and, a lift apparatus extending between said underlying "U" shaped frame and said overlying rectilinear frame for raising and lowering said overlying rectilinear frame with respect to said "U" shaped base;

means for supporting said overlying rectilinear frame in a first position having reduced width for stowage of said stretcher and in a second horizontal position for supporting a patient on said stretcher;

first and second hinges having vertical hinge axes, said first hinge being located midway of one of said stretcher supporting members of said "U" and said second hinge being located midway of the other of said stretcher supporting members of said "U", each said hinge for permitting movement of the one half of said stretcher supporting members remote from the cross member of said "U" between a caster folded position extending the outer extremity of said stretcher supporting member parallel to said base of said "U" underlying the reduced width of said stretcher in said first position having reduced width for the stowage of said stretcher to a second extended position disposing said vertical member of said "U" for support of said stretcher in said second horizontal position for supporting a patient on said stretcher; and, means for locking each of said hinge member sin either said caster folded position or said caster extended position whereby sad stretcher is supported for stowage with reduced dimension between said casters in said caster folded position and is capable of supporting a patient with expanded dimension between said casters in said caster extended position.

7. The patient lift apparatus of claim 6 and wherein said means for locking each said hinge includes:

a spring biased sleeve attached to each said distal leg of said "U" shaped base, said spring biased sleeve biased for movement towards said hinge;

a key attached to said hinge and biased from movement towards and away from said hinge;

first and second keyways in said hinge for engaging said key, said first keyway when engaged to said key for maintaining said hinge in said caster folded position and said second keyway when engaged to said key for maintaining said hinge in said caster extended position.

8. The patient lift apparatus of claim 6 and wherein said overlying rectilinear frame is rotatable with respect to said "U" shaped base between a fist horizontal position for carrying a patient and a second vertical position for storage of said unit.

9. The patient lift apparatus of claim 6 and wherein said overlying rectilinear frame includes hinges midway of said minor members of said rectilinear frame for permitting one half of said frame to fold over another half of said frame.

10. The patient lift apparatus of claim 6 and wherein said patient lift apparatus further includes:
   means for weighting said stretcher between said stretcher frame and said means for supporting said stretcher frame including strain gauge means;
   means for permitting said means for supporting said stretcher means for be raised and lowered towards and away from each other extending between said means for supporting said stretcher frame and said underlying U-shaped frame to enable said stretcher to be maintained parallel to said U-shaped frame during said raising and lowering; and,
   said lifting apparatus extending between said frames, independent of said means of raising and lowering, said lifting apparatus having hinged connections at said U-shaped frame and at said means for supporting said stretcher frame whereby the force of raising and lowering said rectilinear frame is independent of said weighting mechanism.

* * * * *